United States Patent [19]

Batson

[11] Patent Number: 4,976,447
[45] Date of Patent: Dec. 11, 1990

[54] APPARATUS FOR RESTRAINING THE MOVEMENT OF WHEELED CARTS

[76] Inventor: Jack Batson, 4906 Monona Cir., Birmingham, Ala. 35244

[21] Appl. No.: 293,123

[22] Filed: Jan. 3, 1989

[51] Int. Cl.$^5$ .............................................. B62B 5/04
[52] U.S. Cl. ................................ 280/33.994; 188/19; 188/29
[58] Field of Search ...................... 280/33.993, 33.992, 280/33.994; 188/29, 31, 21, 19, 166

[56] References Cited

U.S. PATENT DOCUMENTS

| | | | |
|---|---|---|---|
| 3,500,965 | 3/1970 | Nossokoff et al. | 188/29 |
| 4,018,449 | 4/1977 | Anderson | 280/33.99 |
| 4,084,663 | 4/1978 | Haley | 188/31 |
| 4,706,975 | 11/1987 | Arena et al. | 280/33.99 |
| 4,840,388 | 6/1989 | Batson | 280/33.994 |

OTHER PUBLICATIONS

Sloan, Martin, "Can Shopping-cart Seat Belts Harm Toddlers?", *The Birmingham News*, Oct. 19, 1988.

*Primary Examiner*—Charles A. Marmor
*Assistant Examiner*—Richard Camby
*Attorney, Agent, or Firm*—Wm. Randall May

[57] ABSTRACT

A method and apparatus for a hand-operated, adjustable, braking or restraining device for effectively restraining the movement of wheeled carts such as shopping carts, flat carts, medical carts, and the like, comprises an engagement lever; an engagement rod; a lever-operated common axle; a pair of operating rods and a pair of eccentrically displaced, sliding, cam-operated braking or restraining mechanisms. The engagement lever has a locking position and a free position and when rotated to its locking position, moves the operating rods thereby engaging the braking or restraining mechanisms. The braking or restraining mechanisms are mounted near the rear wheels of the cart and each is configured to have a cam-operated, eccentrically displaced, sliding brake shoe or pad member which frictionally engages each the rear wheel thereby restraining or preventing the rotation of same.

10 Claims, 3 Drawing Sheets

APPARATUS FOR RESTRAINING THE MOVEMENT OF WHEELED CARTS

BACKGROUND OF THE INVENTION

I. Field Of The Invention

The present invention relates to a new method and apparatus for effectively restraining the movement of wheeled carts such as shopping carts, flat carts, medical carts and other similar vehicles.

II. Prior Art and Other Considerations

The restraining device of the present invention is an improvement over prior art devices such as those shown in U.S. Pat. Nos. 3,500,965 and 4,018,449.

Prior art devices have failed to produce commercially or publicly acceptable products in their attempts to provide safe, effective braking or restraining mechanisms for wheeled carts, particularly shopping carts.

Prior art braking or restraining devices generally are designed to be of automatically locking construction or manually locking construction. The automatically locking devices typically employ a spring biased means to automatically engage or lock their braking or restraining mechanism when the cart is at rest or when the cart handle is unengaged. The manually locking devices also typically employ spring biased means to engage or lock their braking or restraining mechanism but will allow the cart to operate freely unless or until the braking mechanism is manually engaged.

One problem with the prior art devices is that the addition of the braking or restraining mechanism or structure to the cart frequently interferes with, restricts, or prevents the nesting of carts, particularly shopping carts. This nesting characteristic is generally desired by the owners of such carts for mass movement of the carts and for storage considerations. Another problem, generally associated with the automatically locking prior art devices, is that the carts cannot be freely moved, either forward or backward, without the operator being in physical contact with the handle or release mechanism of the cart at all times thus preventing the cart from being pushed, pulled or turned from the front of the cart. Another problem with the prior art devices is that, in many cases, the cart had to be specially designed or altered to accommodate the braking or restraining mechanism contemplated thereby. An additional problem with these prior art devices is that the wheel restraining mechanisms used in the prior art frequently tend to damage the cart wheels on which they operate by the very nature of their design and construction.

For the above and other reasons, movement restraining mechanisms are not currently being provided to wheeled carts, specifically shopping carts commonly used in shopping centers, malls, and supermarkets. This presents a very serious problem with regard to damage suffered by persons and property from runaway carts as can be well documented by insurance company claims files.

SUMMARY OF THE INVENTION

In view of the foregoing, it is an object of the present invention to provide a method and apparatus for effectively restraining the movement of wheeled carts and other similar vehicles in a simple, economical, and accommodating manner.

It is an advantage of the present invention to provide a method and apparatus for restraining the movement of wheeled carts that is effective, durable, and simple to operate.

It is an advantage of the present invention to provide a method and apparatus for restraining the movement of wheeled carts that is economical to construct, requiring relatively few parts, and that is particularly designed to be readily retrofitted for use on existing carts.

Another advantage of the present invention is to provide a method and apparatus for restraining the movement of wheeled carts which is accommodating and which does not interfere with or prevent the nesting aspect of such carts.

Another advantage of the present invention is to provide a method and apparatus for restraining the movement of wheeled carts that is adjustable and self-contained.

A further advantage of the present invention is to provide a method and apparatus for restraining the movement of wheeled carts which utilizes eccentrically displaced restraining or braking mechanisms to slidably engage targeted wheels.

Still another advantage of the present invention is to provide a method and apparatus for restraining the movement of wheeled carts that restrains the movement of the cart only when such restraint is desired by the operator.

Yet another advantage of the present invention is to provide a method and apparatus for restraining the movement of wheeled carts to utilize concentric friction pads or shoes for engaging targeted wheels.

A further advantage of the present invention is to provide a method and apparatus for restraining the movement of wheeled carts that will not damage the wheels of the cart during, or as a result of, the restraining operation.

According to the invention, a movement restraining mechanism for wheeled carts comprises an engaging means, a positioning means, and a restraining means. The engaging means moves the positioning means in a manner whereby the restraining means, through eccentric displacement, effectively engages the targeted wheels of a cart or other similar vehicle thereby preventing movement of the vehicle.

BRIEF DESCRIPTION OF THE DRAWINGS

The foregoing and other objects, features, and advantages of the present invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
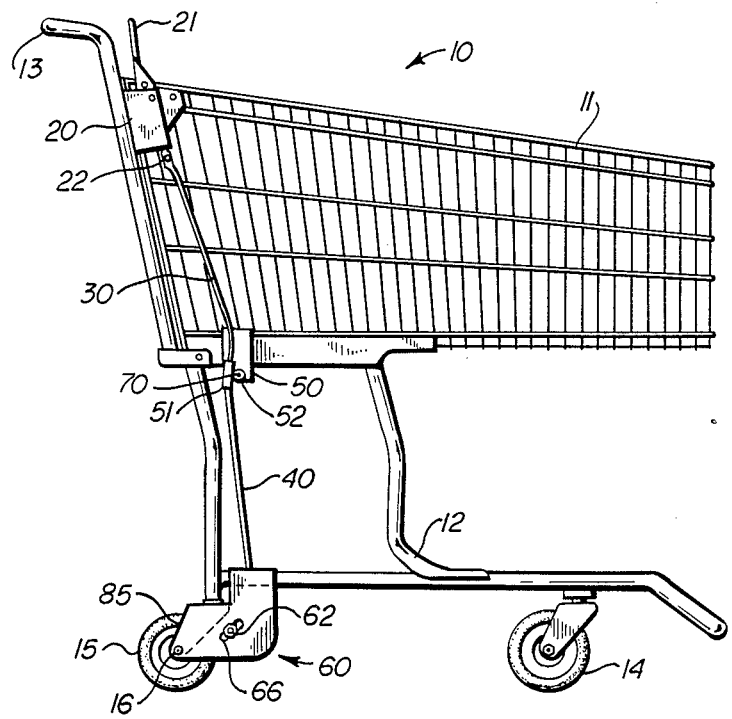
FIG. 1 is a side elevational view of a typical shopping cart or basket with an embodiment of the present invention operatively mounted thereto.

The cart restraining device of FIG. 1 is shown operatively mounted to a typical shopping cart (10) and comprises a remote, hand-operated, engagement mechanism (20); an engagement rod (30); operating rods (40 and 41); a lever-operated common axle (70) (not shown in FIG. 1); and, a wheel restraining means (60).

The shopping cart (10), as shown, has a basket (11); a frame (12); a handle (13); a pair of swiveling front wheels (14); and a pair of fixed-position rear wheels (15).

Figure 4:
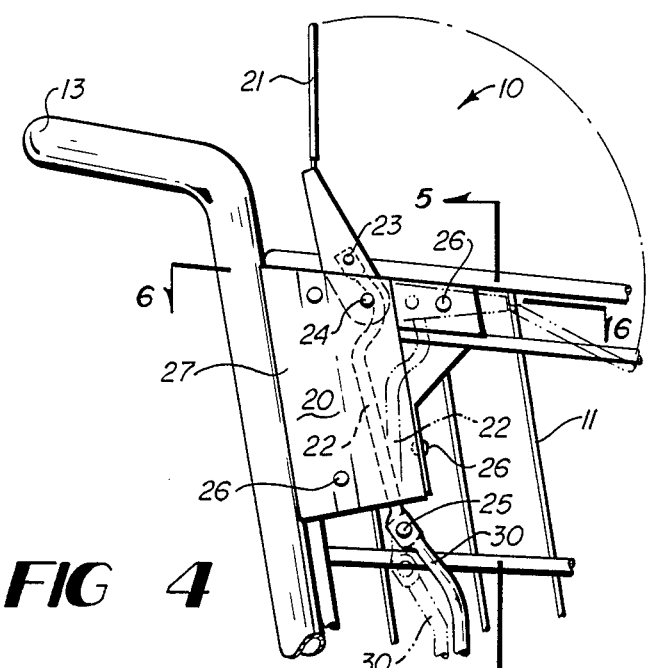
FIG. 4 is an enlarged side view of the lever assembly of the embodiment of FIG. 1, illustrating the locking and unlocking positions of the lever.
Figure 5:
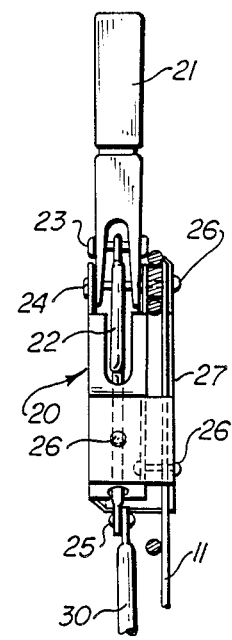
FIG. 5 is a front elevational view of the apparatus of FIG. 4.
Figure 6:
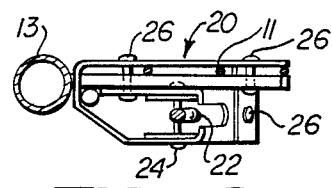
FIG. 6 is a sectioned, plan view of the apparatus of FIG. 4 taken along the line 6—6.
Figure 7:
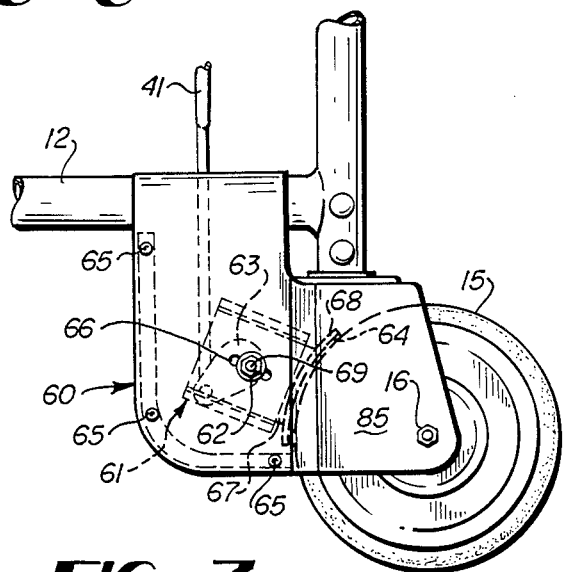
FIG. 7 is an enlarged detail side elevational view of the restraining mechanism of the present invention shown operatively mounted to a rear wheel of a typical shopping cart or basket.
Figure 8:
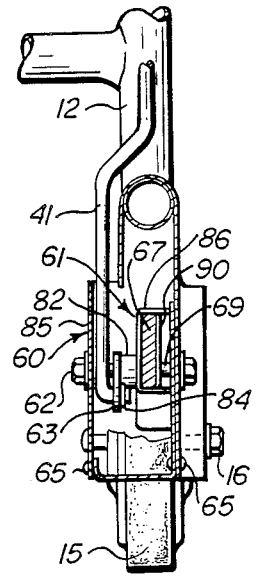
FIG. 8 is a sectioned, front elevational view of the apparatus of FIG. 7 taken along the line 8—8.

As seen in FIG. 4, the remote, hand-operated, engagement mechanism (20) has an engagement lever (21); a connecting rod (22); a lever axis pin (24); a connecting rod axis pin (23); and an engagement mechanism housing (27) for mounting the mechanism (20) to one side of basket (11) in the vicinity of the cart handle (13). The engagement lever (21) is rotatably and operatively attached at one end to the engagement mechanism housing (27) through the lever axis pin (24). The connecting rod (22) is rotatably and operatively attached at one end to the engagement lever (21) through the connecting rod axis pin (23) at a point between the location of the lever axis pin (24) and the unattached end of the engagement lever (21). The connecting rod (22) is curved in a manner to allow the connecting rod axis pin (23) to be rotated to a point beyond the verticle center line of the lever axis pin (24) during the operation of the engagement mechanism (20). This positioning of the connecting rod axis pin (23) results in a generally downward or rearward force upon lever axis pin (24) which creates a locking condition when the engagement lever (21) is rotated to its most verticle position. The other end of the connecting rod (22) is fitted with an axis pin (25) for rotatably and operatively receiving and securing the connecting rod (22) to the engagement rod (30). The engagement mechanism housing (27) is securely attached to one side of the basket (11) by a plurality of rivets (26).

Figure 2:
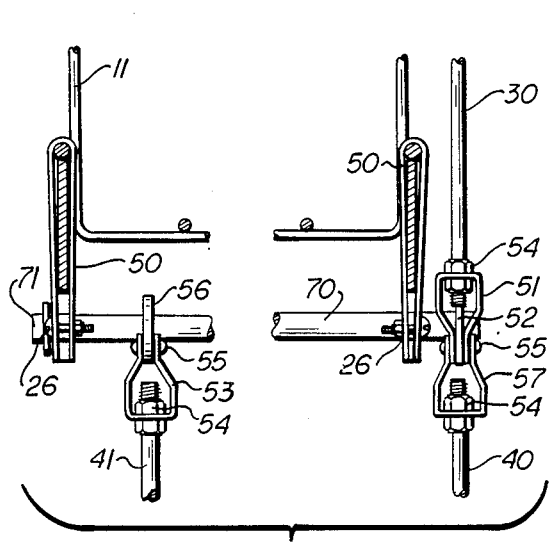
FIG. 2 is an enlarged, fragmentary, rear elevational view of the common axle, the operating rods, and the associated control linkage according to an embodiment of the present invention.
Figure 3:
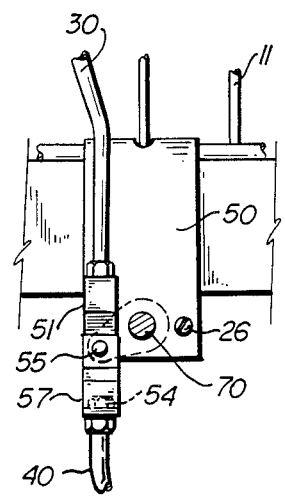
FIG. 3 is an enlarged side view of the linkage assembly of the embodiment of FIG. 1.

The engagement rod (30) extends downwardly from its connection point with connecting rod (21), at axis pin (25), to a termination point near the bottom of basket (11). As shown in FIG. 2 and FIG. 3, the lower end of the engagement rod (30) is threaded and is provided with an inverted stirrup-shaped linkage member (51), secured to said engagement rod (30) by a securing means (54), such as a nut, for receiving and securing the engagement rod (30) to a first lever (52). The inverted stirrup-shaped linkage member (51) is further attached to a companion stirrup-shaped linkage member (57) attached to the upper end of the right operating rod (40) and secured thereto. The stirrup-shaped linkage members (51) and (57) are rotatably attached to one end of the first lever (52) at axis pin (55). The other end of the first lever (52) is securely and non-rotatably attached to an end (the right end as shown in FIG. 2) of the common axle (70).

Referring now specifically to FIG. 2, the common axle (70) extends horizontally the entire width of the basket (11) and is rotatably secured thereto at either end of the axle (70) by mounting plates (50). Each of the mounting (50) is securely attached to a side of basket (11) by a securing means (26), such as a bolt and nut. The left end of the common axle (70) is provided with a retaining cap (71). A second lever (56) is non-rotatably attached to the common axle (70) in synchronous relationship to the first lever (52) at a point on the axle (70) near its left end. Said second lever (56) is rotatably attached at its outer end to another stirrup-shaped control linkage (53) for supporting and securing operating rod (41).

The operating rods (40 and 41) extend downwardly from their respective positions on the common axle (70), at either side of basket (11), to the wheel restraining means (60) located at each rear wheel (15) of the cart (10).

Each wheel restraining means (60) has a housing (85) and a wheel restraining mechanism (61). The housing (85) is secured to the cart frame (12) by a plurality of rivets (65) and is secured to each rear wheel's axle pin (16). Each wheel restraining mechanism (61) is securely attached to the housing (85) by a securing means (62), such as a nut, attached to either end of a cam shaft (69) extending laterally through the restraining mechanism (61). The housing (85) is provided with adjustment slots (66) for lateral adjustment of the cam shaft (69).

Figure 9:
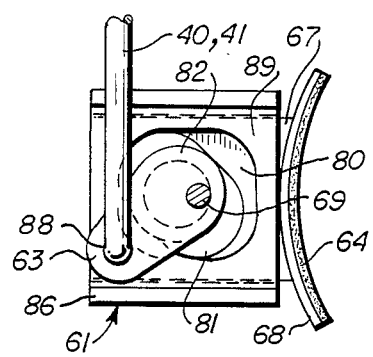
FIG. 9 is an enlarged detail side elevational view of the wheel restraining mechanism shown in an unengaged position.
Figure 10:
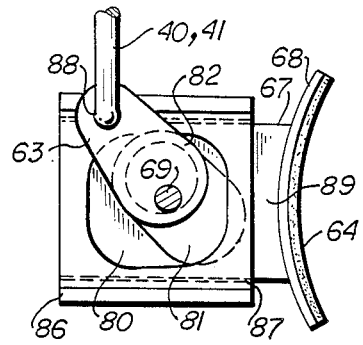
FIG. 10 is a side elevational view of the apparatus of FIG. 9 showing the device in an engaged position.
Figure 11:
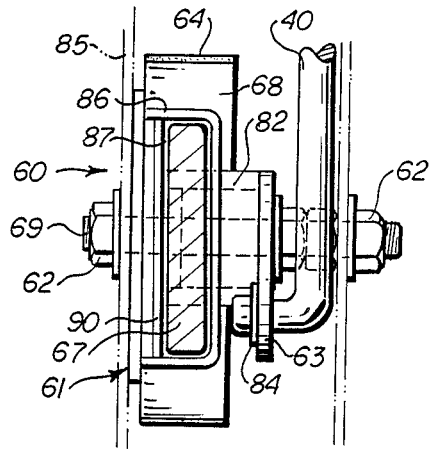
FIG. 11 is a front elevational view of the apparatus of FIG. 9.

As seen in FIG. 9 and FIG. 10, each wheel restraining mechanism (61) has a carriage (86); a cam (63); and a sliding brake member (67). The carriage (86) is provided with a carriage slot (87) for slidably receiving the sliding brake member (67); a carriage hole (80) through the face of one side of the carriage (86); and an intermediate plate (90) forming the interior wall of carriage slot (87).

The cam (63) has a pipe (82) non-rotatably attached to the inner side of its large end which is positioned within the space created by the carriage hole (80) of carriage (86) and rests against the intermediate plate (90). The small end of the cam (63) has a cam hole (88) for rotatably receiving the lower end of the operating rod (40 or 41). The operating rod (40 or 41) is secured to the cam (63) through the cam hole (88) by a retaining clip (84). Extending through the pipe (82) and the large end of the cam (63) and the carriage hole (80) is the shaft (69). The shaft (69) is securely and eccentrically attached to the inside surface of the pipe (82) at a point closest to the rear wheel (15) when the sliding brake member (67) is farthest from the rear wheel (15) as a result of being in an unengaged position near the large end of the cam (63).

Figure 12:
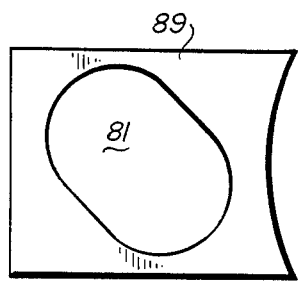
FIG. 12 is a plan view of the sliding member of the restraining mechanism of the present invention.
Figure 13:
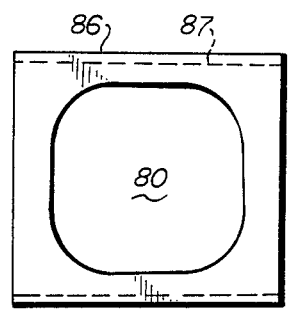
FIG. 13 is a plan view of the carriage for the restraining mechanism of the present invention.

The sliding brake member (67) has a sliding bar (89), generally rectangular in shape; a concentrically-shaped brake shoe (68) attached to one end of the sliding bar (89); and a brake pad (64) attached to the inside surface of brake shoe (68). The sliding bar (89) is configured to slidably engage the carriage slot (87) in carriage (86) and contains a driving slot (81) with rounded ends, as shown in FIG. 12. The driving slot (81) is positioned at a 45 degree angle with respect to the sides of the sliding bar (89) so as to cause the long axis of the driving slot (81) to tilt towards the upper left corner of sliding bar (89). Said driving slot (81) is of sufficient width and is of sufficient radius at it curved ends to rotatably and moveably receive cam pipe (82). Said brake shoe (68) is curved on a radius generally concentric with that of the rear cart wheels (15). Attached to brake shoe (68) is the brake pad (64) which is comprised of frictionally resistive material such as rubber or the like. The sliding brake member (67) is positioned within the carriage (86) in a manner to operatively receive and engage the cam pipe (82) and shaft (69) within the space created by the driving slot (81).

In operation, as the engagement lever (21) is rotated to its most vertical position, the connecting rod (22) is moved in a generally upward direction. This upward movement, through interconnection, causes similar movement in the engagement rod (30) and the first lever (52) of the common axle (70).

The upward movement of the first lever (52) rotates the common axle (70) thereby causing the operating rods (40 and 41), which are synchronously attached to the common axle (70), to simultaneously move in an upward direction.

The synchronized upward movement of the operating rods (40 and 41) causes the cam (63) of each wheel restraining mechanism (61) to rotate about its shaft (69). The eccentric configuration of the shaft (69) to the cam pipe (82), causes the cam pipe (82) to rotate and to move generally laterally, during the rotation of the cam shaft (69), in a generally linear direction. The placement of the cam pipe (82) within the carriage hole (80) and within the driving slot (81) forces the sliding brake member (67), as the cam (63) is rotated, to slide in the direction of the rear wheels (15). This sliding movement of the sliding brake member (67) causes the brake pad (64) to frictionally engage the rear wheels (15) of the cart (10) thereby effectively restraining the rear wheels (15) from rotation.

The eccentric movement of the cam pipe (82) in concert with the selection of the point of eccentric attachment of the cam shaft (69) to the inside surface of the pipe (82) provides for a self-locking effect so that the back pressure from the rear wheels (15) cannot be transmitted to the system of rods and/or shafts, notwithstanding the fact that slight pressure on the engagement (21) lever will result in disengagement of the brake shoe (68).

The braking mechanism of the present invention is made adjustable by the adjustment slots (66) contained in the housing (85) which allows for proper adjustment of the cam shaft (69) to accommodate wear to the brake pad (64).

While the invention has been particularly shown and described with reference to the preferred embodiments thereof, it will be understood by those skilled in the art that various alterations in form, detail and construction may be made therein without departing from the spirit and scope of the invention.

The embodiments of the invention in which an exclusive property right or privilege is claimed are defined as follows:

1. An apparatus for restraining the movement of wheeled carts such as shopping carts or other similar vehicles having a frame, a handle, and wheels, said apparatus comprising:
   an engagement lever;
   means for rotatably attaching said engagement lever to said cart or vehicle;
   a housing for securing said engagement lever to said cart or vehicle;
   a connecting rod attached to said engagement lever at a position on said engagement lever which produces a reciprocating movement of said connecting rod as said engagement lever is rotated about its axis;
   an engagement rod attached to said connecting rod and extending downwardly along the side of said cart or vehicle to a termination point;
   a linkage assembly attached to said engagement rod at the point of termination of said engagement rod;
   a common axle, extending horizontally the entire width of said cart or vehicle, rotatably attached to said cart or vehicle and operatively attached to said engagement rod through said linkage assembly;
   a pair of levers, spacably and non-rotatably attached to said common axis with one of said pair of levers also rotatably attached to said linkage assembly in a manner whereby any reciprocating movement of said linkage assembly produces rotation of said common axle;
   a pair of operating rods each rotatably attached to one of said pair of levers and extending downwardly therefrom to a point near two of the wheels of said cart or vehicle;
   means, attached to each of said operating rods, for restraining the movement of said wheels of said cart or vehicle.

2. The apparatus of claim 1, wherein an axis pin and rivet is used to rotatably attach said engagement lever to said cart or vehicle.

3. The apparatus of claim 1, wherein mounting plates are bolted to either side of said cart or vehicle for rotatably attaching said common axle to said cart or vehicle.

4. The apparatus of claim 1, wherein said linkage assembly comprises a pair of stirrup-shaped linkage members.

5. The apparatus of claim 1, wherein said means for restraining the movement of said cart or vehicle wheels further comprising:
   a carriage containing a slot and a hole, said hole being positioned on one face of said carriage;
   a cam rotatably secured at its small end to one of said pair of engagement rods;
   a pipe secured to the large end of said cam extending outward therefrom and positioned within the space created by said hole of said carriage;
   a shaft eccentrically and non-rotatably attached to the inside surface of said pipe and extending through said pipe, cam, and carriage;
   a sliding brake member slidably received within said carriage slot and containing a driving slot, having rounded ends, angleably positioned at one end of said sliding brake member and configured to receive said cam pipe and shaft within the space created by said driving slot wherein the rotation and operation of said eccentrically attached shaft and cam pipe imparts a linear movement to said sliding brake member urging said member in the direction of said wheels;
   a concentrically-shaped brake shoe member attached to one end of said sliding brake member; and, a brake pad attached to the inner surface of said brake shoe member for frictionally engaging the wheels of said cart or vehicle.

6. An apparatus for restraining the movement of shopping carts having a frame, a handle, a basket, a pair of rear wheels and a pair of front wheels, said apparatus comprising:

an engagement lever;

means for rotatably attaching said engagement lever to said cart;

a housing for securing said engagement lever to said cart;

a connecting rod attached to said engagement lever at a position on said engagement lever which produces a reciprocating movement of said connecting rod as said engagement lever is rotated about its axis;

an engagement rod attached to said connecting rod and extending downwardly along the side of said cart to a termination point near the bottom of said cart basket;

a linkage assembly attached to said engagement rod at the point of termination of said engagement rod;

a common axle, extending horizontally the entire width of said cart, rotatably attached to said cart and operatively attached to said engagement rod through said linkage assembly;

a pair of levers, spacably and non-rotatably attached to said common axle with one of said pair of levers also rotatably attached to said linkage assembly in a manner whereby any reciprocating movement of said linkage assembly produces rotation of said common axle;

a pair of operating rods each rotatably attached to one of said pair of levers and extending downwardly therefrom to a point near the rear wheels of said cart;

means, attached to each of said operating rods, for restraining the movement of said rear wheels of said cart.

7. The apparatus of claim 6, wherein an axis pin and rivet is used to rotatably attach said engagement lever to said cart.

8. The apparatus of 6, wherein mounting plates are bolted to either side of said cart for rotatably attaching said common axle to said cart.

9. The apparatus of claim 6, wherein said linkage assembly comprises a pair of stirrup-shaped linkage members.

10. The apparatus of claim 6, wherein said means for restraining the movement of said rear cart wheels further comprising:

a carriage containing a slot and a hole, said hole being positioned on one face of said carriage;

a cam rotatably secured at its small end to one of said pair of engagement rods;

a pipe secured to the large end of said cam extending outward therefrom and positioned within the space created by said hole of said carriage;

a shaft eccentrically and non-rotatably attached to the inside surface of said pipe and extending through said pipe, cam, and carriage, a sliding brake member slidably received within said carriage slot and containing a driving slot, having rounded ends, angleably positioned at one end of said sliding brake member and configured to receive said cam pipe and shaft within the space created by said driving slot wherein the rotation and operation of said eccentrically attached shaft and cam pipe imparts a linear movement to said sliding brake member urging said member in the direction of said rear wheels;

a concentrically-shaped brake shoe member attached to one end of said sliding brake member; and, a brake pad attached to the inner surface of said brake shoe member for frictionally engaging the rear wheels of said cart.

* * * * *